No. 781,014. PATENTED JAN. 31, 1905.
T. J. O'BRIEN.
STREET RECEIVER.
APPLICATION FILED JULY 25, 1904.
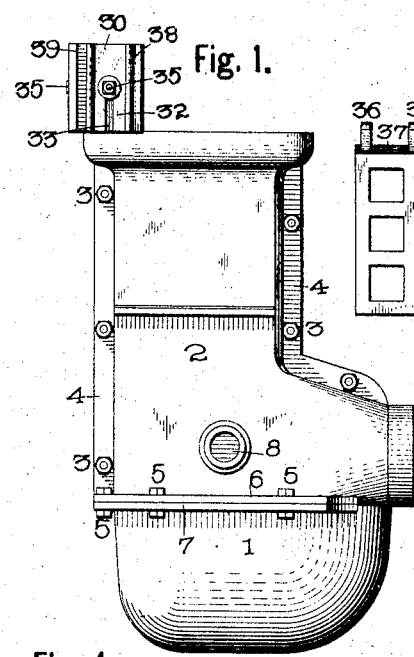
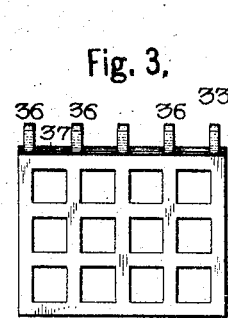
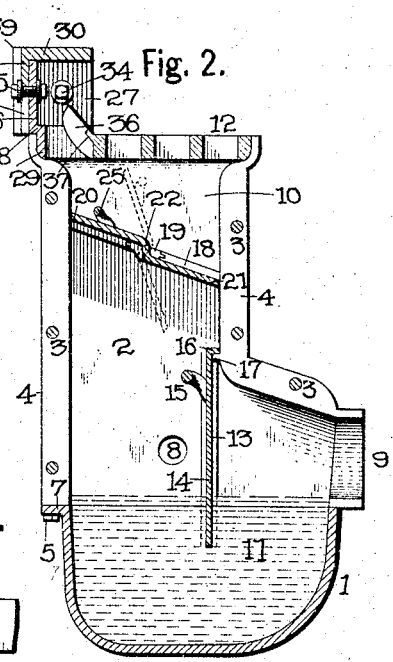
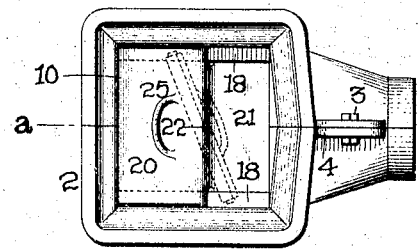
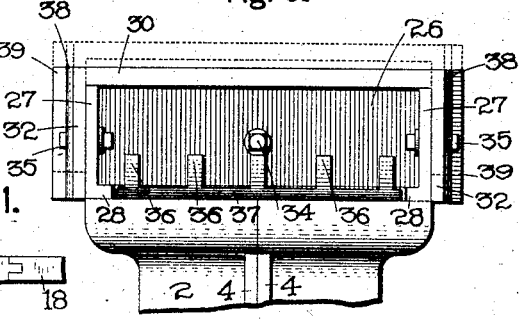
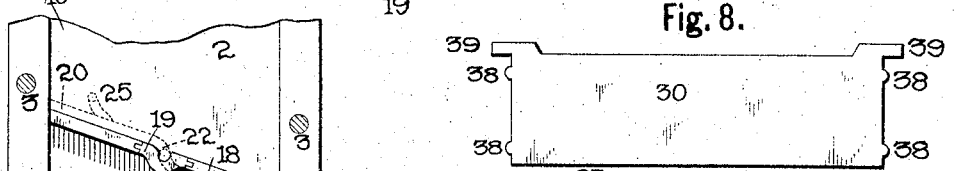
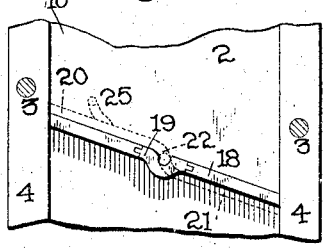
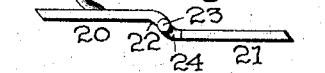
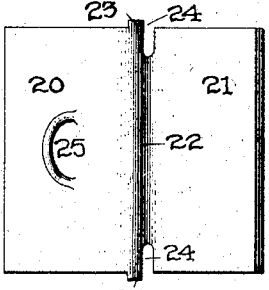
Witnesses.
Chas. J. Pankow.
Geo. A. Neubauer.
Inventor.
Thomas J. O'Brien.
By A. J. Sangster,
Attorney.

No. 781,014.

Patented January 31, 1905.

UNITED STATES PATENT OFFICE.

THOMAS J. O'BRIEN, OF BUFFALO, NEW YORK.

STREET-RECEIVER.

SPECIFICATION forming part of Letters Patent No. 781,014, dated January 31, 1905.

Application filed July 25, 1904. Serial No. 218,029.

*To all whom it may concern:*

Be it known that I, THOMAS J. O'BRIEN, a citizen of the United States, residing at Buffalo, in the county of Erie and State of New York, have invented certain new and useful Improvements in Street-Receivers, of which the following is a specification.

This invention relates to that class of devices known as "street-receivers" which are located in the ground and connected to a sewer or other suitable outlet and serve to catch the surface water on the street.

One of the features of the invention consists in constructing the valve-plate in angular form with a pivot portion approximately midway and two flat portions one on each side of the pivot portion and in different but parallel planes and providing the receiver-body with straight parallel inclined flanges, each of which has a curved seat for the pivot portions of the valve-plate and each being entirely straight throughout with the exception of the curved pivot-seat.

Another feature of the invention consists in forming a pivot-seat of separate metal and rigidly securing it in place in the inclined flanges which support the valve-plate, thereby securing uniform, regular, smooth, and perfect seats for the pivots of the valve-plates.

Another feature consists in providing the gutter-grate at its rear edge with a series of integral prongs which extend up into the curb-casing to near the top thereof and take the place of the separate upright curb-grate, besides providing a top space extending across the interior of the curb-casing for the passage of fairly large material, said prongs having diagonally inwardly and upwardly extending outer surface to facilitate the passage of large material.

The objects of this improvement are to reduce the number of parts and to cheapen and strengthen the construction.

This invention also relates to certain details of construction, all of which will be fully and clearly hereinafter described and claimed, reference being had to the accompanying drawings, in which—

Figure 1 is a side elevation of my improved street-receiver. Fig. 2 is a vertical section on line *a a*, Fig. 4. Fig. 3 is a detached top plan view of the gutter-grate. Fig. 4 is a top plan view of receiver with curb-casing and gutter-grate removed. Fig. 5 is an enlarged fragmentary front elevation of receiver to illustrate the adjustable curb-casing, two adjustments being shown in dotted and full lines. Fig. 6 is an enlarged fragment of the gutter-grate to show one of the integral prongs. Fig. 7 is a fragment of one of the sections of the receiver-body to show the straight inclined flange, the valve-plate being shown in position thereon in dotted lines. Fig. 8 is an enlarged detached top plan view of the curb-casing. Fig. 9 is an enlarged detached top plan view of the valve-plate. Fig. 10 is an enlarged detached edge view of the valve-plate. Fig. 11 is a fragment of one of the flanges to show the manner of securing the separate seat in place therein.

In referring to the drawings for the details of construction like numerals designate like parts.

The casing or body of the receiver consists of a dished-bottom member 1 and an upper member 2, which is formed in two sections. These two sections are bolted together by bolts 3, which pass through flanges 4, and to the bottom member by bolts 5, which pass through the contacting flanges 6 and 7, extending, respectively, from the sectional top member and the bottom member. Openings 8 are formed in the side of the casing or body for the attachment of drain or other pipes, which may be plugged up or otherwise closed when not connected to pipes. A tubular portion 9 extends from one end of the upper member and is adapted to be secured to a sewer or other pipe, being preferably telescoped therein in the usual manner. The opening in the receiver is vertical and of substantially square or rectangular form in cross-section in its upper portion, as shown at 10 in Figs. 2 and 4, and enlarges in the lower portion of the receiver to form a water-chamber 11. The opening 10 enlarges at the top to form a seat, in which the horizontal gutter-grate 12 is supported. Oppositely-disposed slideways 13 are arranged on opposite sides of the upper casing, and a valve-plate 14 is slidably supported in these slideways. (See Fig. 2.) The valve-plate has a handle 15 and a top flange 16, and a ledge or shoulder 17 extends inwardly from the casing, upon which the top flange 16 of the valve-plate 14 rests and is supported when the plate is in its lower position, as shown in Fig. 2. When the valve-plate is in its lower position, it divides the water-chamber into two compartments and forms a water seal by extending beneath the water-line. (See Fig. 2.)

Each of the two sections of the top member of the receiver is provided with a straight inclined flange 18, which extends inwardly and is provided at or near its middle with a curved part 19, which constitutes a seat for a pivot. This seat 19 is formed separately from the metal of the flange and is fastened rigidly in place when the section of the top member is cast by placing it in proper position in the mold and casting the metal of the flange around it. The separate seat can be stamped, drop-forged, or cast from steel, brass, or other suitable metal and is finished before being placed in position, so that the seats are always uniform, perfect, and regular and form a smooth easy socket for the pivots. These flanges extend parallel and serve to pivotally support a valve-plate between them, which normally closes the upper portion of the opening in the receiver. The valve-plate is of angular form, having two flat portions 20 and 21, which are in different but parallel planes and are joined to each other by an angular or curved intermediate portion 22. Pivot-lugs 23 project oppositely from the angular portion 22, and grooves or recesses 24 are cut in the angular portion below the pivots, as shown in Figs. 9 and 10. In placing the valve-plate in position in the receiver-body it is lowered in diagonal position, as shown in dotted lines in Fig. 4, until the grooves 24 are horizontally opposite the flanges 18 and then turned to bring the pivots into the seats 19 and lock the valve-plate in position against removal by a slight movement. When the valve-plate is closed, the opposite marginal edges of the portion 20, which is above the angular portion 22, seat upon the top surface of those parts of the flanges 18 above the curved seats 19, and the opposite marginal edges of the portion 21 fit up against the bottom surface of those parts of the flanges 18 below the curved seat. The valve-plate is provided with a handle 25 for convenient exterior manual manipulation when desired, and the portion 20 is made slightly heavier than the portion 21, so that it is normally in closed position. When material or water passes into the receiver, it drops upon the valve-plate and collects upon the lower portion 21, and when said material or water is sufficient to overbalance the slight additional weight of the portion 20 the valve-plate turns automatically on its pivot and drops the material and water into the receiver and when freed from the same is again automatically closed by the additional weight of the portion 20.

An adjustable curb-casing is mounted on the rear portion of the receiver-body and is so constructed that it can be lengthened or shortened vertically to enable its top surface to be arranged horizontally flush with the top surface of the curbstone. This dispenses with the fine adjustment required with non-extensible casings and enables the workmen to place the receiver in approximate position in the ground and then adjust the curb-casing instead of the entire receiver and likewise dispenses with the requirement of different sizes of receivers and curb-casings to suit different heights of curbstones. The curb-casing is formed in two lapping sections or members, the inner or lower one of which is mounted on the receiver-body and is fixed in position thereon and the outer or upper one of which partially surrounds and is slidably fitted upon the inner section and is locked thereto in its adjusted position by bolts or the like. The inner section of the curb-casing has a vertical rear wall 26, two vertical side walls 27, which are joined at their rear edges to the ends of the rear wall 26, short horizontal parts 28, which extend inwardly from the lower ends of the side walls and form horizontal shoulders which seat upon the top edge of the receiver-body, and vertical parts 29, extending downward from the inner ends of the horizontal parts 28, which project within the receiver to prevent lateral movement of the curb-casing in the receiver-top. The outer or upper section or member is preferably cast in one piece and comprises a horizontal top wall 30, a vertical rear wall 31, and two vertical side walls 32. The rear and side walls 31 and 32 are provided with one or more vertical slots 33, which extend from the lower end thereof to near the top, and bolts 34 are fitted through openings in the rear and side walls of the inner section, with their screw-threaded ends projecting through the slots 33, upon which nuts 35 are screwed to fasten the outer or adjustable section in its adjusted position.

The gutter-grate 12 is provided with a series of separated prongs or teeth 36, extending from its rear end, which project up into the opening in the curb-casing. These prongs or teeth preferably extend upwardly and inwardly on a slant or incline to more readily enable the material collected on the grate to be pushed up and over the top ends of the prongs and into the receiver. These prongs are formed integral with and supported solely from the gutter-grate, so that the adjustment of the curb-casing will not interfere with these at all. It will be noted that the prongs terminate at a short distance below the inner surface of the casing, so that a space is left in the upper portion of the casing, which extends entirely across the same, for the passage of fairly large material. The prongs are connected to each other for a short distance above their lower ends by a web 37, which serves to strengthen the gutter-grate construction and the connection of the prongs thereto.

The upper member of the curb-casing may be provided with vertical enlargements or ribs 38 on its sides to lock the same in place between the curbstones, which can be cut out to receive said ribs 38, and vertical projections 39, extending from the rear corners thereof, which fit against the inner surface of the curbstones.

I claim as my invention—

1. In a receiver, the combination with a body having interior diagonally-extending flanges with intermediate curved seats which are entirely straight throughout with the exception of the curved seats, of a valve-plate having two flat portions in different but parallel planes and pivots adapted to be supported in the curved seats.

2. In a receiver, the combination with a body having interior diagonally-extending parallel flanges with intermediate curved seats which are entirely straight throughout with the exception of the curved seats, of a valve-plate having two flat portions in different but parallel planes connected by an angular part and pivots extending from the angular part and adapted to be supported in the curved seats.

3. In a receiver, a body having interior flanges, and a valve-plate adapted to be inserted diagonally in said body and turned to bring it into position therein; said valve-plate having opposite grooves in the side edges thereof for the passage of the flanges of said body, substantially as set forth.

4. In a receiver, a body having interior flanges and pivot-seats, and a valve-plate adapted to be inserted diagonally in said body and turned to bring it into position therein; said valve-plate having opposite grooves in the side edges thereof for the passage of the flanges of said body and pivots engaging in the pivot-seats, substantially as set forth.

5. In a receiver, a body having interior flanges cast integral with said body and finished pivot-seats of different metal secured in said flanges, whereby uniform perfect and regular seats with smooth easy sockets are provided and a valve-plate having pivots engaging in said seats, as set forth.

6. In a receiver, a body having interior flanges cast integral with said body and each of which is in two parts having separated ends, a finished pivot-seat of different metal extending between the separated ends, whereby uniform perfect and regular seats with smooth easy sockets are provided and a valve-plate having pivots engaging in said seats, substantially as set forth.

7. In a receiver, a body having interior flanges cast integral with said body and each of which is in two parts having separated ends; a finished pivot-seat of different metal extending between the separated ends, whereby uniform perfect and regular seats with smooth easy sockets are provided; said pivot-seat being rigidly secured in position when the receiver is cast and a valve-plate having pivots engaging in said seats, substantially as set forth.

8. In a receiver, a body having a top opening, a curb-casing mounted on the body and having a side opening, and a gutter-grate over the top opening in the body having prongs projecting diagonally rearward and upward from its rear end into the side opening in the casing.

9. In a receiver, a body having a top opening, a curb-casing and a gutter-grate over the top opening in the body having prongs projecting diagonally upward and rearward into the curb-casing and a web connecting said prongs, substantially as set forth.

10. In a receiver, a body having a top opening, a curb-casing mounted on the body and having a side opening, and a gutter-grate over the top opening in the body having prongs projecting upward from its rear end into the side opening in the casing and a web connecting said prongs at their junction with the gutter-grate, substantially as set forth.

11. In a receiver, a cast body, pivot-seats of finished uniform and smooth construction rigidly secured in position in the interior of said body when the receiver is cast and a valve-plate having pivots engaging in said pivot-seats, substantially as set forth.

12. In a receiver, a cast body and pivot-seats of different and finished metal secured in place in said cast body when the body is cast, whereby uniform perfect and regular seats with smooth easy sockets are provided and a valve-plate having pivots adapted to engage in said pivot-seats, substantially as set forth.

THOMAS J. O'BRIEN.

Witnesses:
GEO. A. NEUBAUER,
CHAS. J. PANKOW.